(12) United States Patent
Golla et al.

(10) Patent No.: US 7,787,698 B2
(45) Date of Patent: *Aug. 31, 2010

(54) SIGN CODING AND DECODING

(75) Inventors: Kumar S. Golla, Plano, TX (US); David K. Vavro, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 870 days.

This patent is subject to a terminal disclaimer.

(21) Appl. No.: 10/741,027

(22) Filed: Dec. 19, 2003

(65) Prior Publication Data

US 2005/0133607 A1    Jun. 23, 2005

(51) Int. Cl.
*G06K 9/36*    (2006.01)
(52) U.S. Cl. .............. 382/232; 382/245; 382/251; 382/307; 348/395.1; 348/398.1; 348/405.1; 358/426.14; 375/240.11; 375/240.18; 375/240.24; 375/240.19

(58) Field of Classification Search ......... 382/232–253, 382/307; 348/395.1, 398.1, 405.1; 375/240.11, 375/240.18, 240.21, 240.24, 240.19; 358/426.14
See application file for complete search history.

(56) References Cited

U.S. PATENT DOCUMENTS

| | | | | |
|---|---|---|---|---|
| 6,674,536 | B2 * | 1/2004 | Long et al. .............. | 358/1.15 |
| 6,778,709 | B1 * | 8/2004 | Taubman ................. | 382/240 |
| 2004/0109059 | A1 * | 6/2004 | Kawakita ................ | 348/143 |

* cited by examiner

*Primary Examiner*—Samir A. Ahmed
*Assistant Examiner*—John W Lee
(74) *Attorney, Agent, or Firm*—Kacvinsky Daisak PLLC

(57) ABSTRACT

Embodiments of the invention provide an instruction that computes the horizontal and vertical values (H,V) based upon the predefined equations. Based upon the horizontal and vertical values (H,V) and the current sign bit being processed at [m,n], the output context and decision pair (CX,D) is determined placed into a destination register.

14 Claims, 6 Drawing Sheets

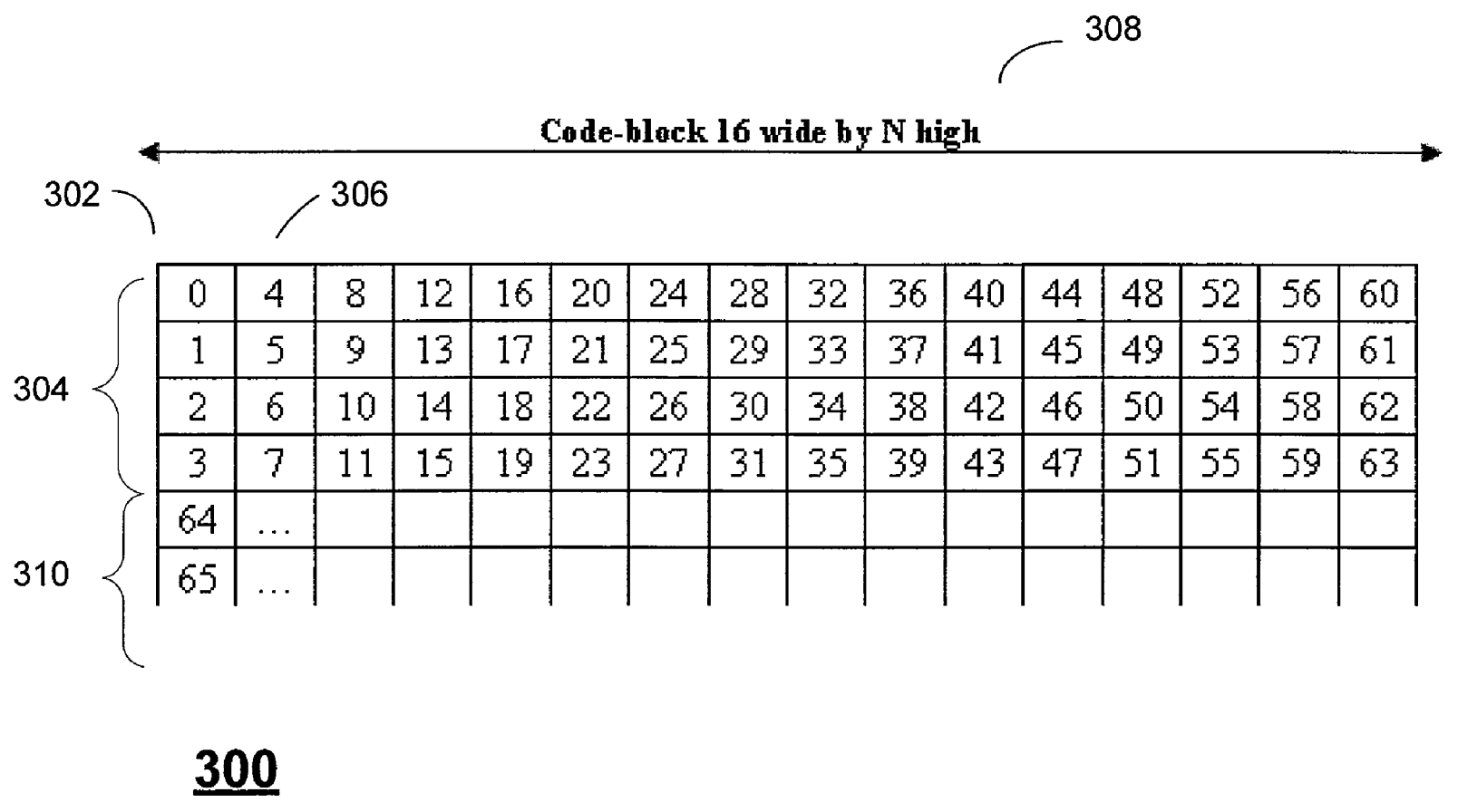

|   | 0 | 4 | 8 | 12 | 16 | 20 | 24 | 28 | 32 | 36 | 40 | 44 | 48 | 52 | 56 | 60 |   |   |
|---|---|---|---|----|----|----|----|----|----|----|----|----|----|----|----|----|---|---|
|   | 1 | 5 | 9 | 13 | 17 | 21 | 25 | 29 | 33 | 37 | 41 | 45 | 49 | 53 | 57 | 61 |   |   |
|   | 2 | 6 | 10| 14 | 18 | 22 | 26 | 30 | 34 | 38 | 42 | 46 | 50 | 54 | 58 | 62 |   |   |
|   | 3 | 7 | 11| 15 | 19 | 23 | 27 | 31 | 35 | 39 | 43 | 47 | 51 | 55 | 59 | 63 |   |   |
|   | 64|...|   |    |    |    |    |    |    |    |    |    |    |    |    |    |   |   |
|   | 65|...|   |    |    |    |    |    |    |    |    |    |    |    |    |    |   |   |

Code-block 16 wide by N high

FIG. 3

SIGN CODING AND DECODING

RELATED APPLICATIONS

This application is related to U.S. application Ser. No. 10/741,038, filed on Dec. 19, 2003, entitled "Bit-Plane Formatting Including Zero Bit-Plane Detection"; U.S. application Ser. No. 10/742,381, filed on Dec. 19, 2003, entitled "Magnitude Refinement Coding"; U.S. application Ser. No. 10/741,572, filed on Dec. 19, 2003, entitled "Run Length Coding and Decoding"; U.S. application Ser. No. 10/742,118, filed on Dec. 19, 2003, entitled "Zero Coding"; and U.S. application Ser. No. 10/742,155, filed on Dec. 19, 2003, entitled "Zero Coding or Run Length Coding Decision."

BACKGROUND

The JPEG 2000 standard utilizes transforms and provides a coding scheme and code stream definition for images. (See JPEG2000 standard, Information Technology—JPEG 2000 Image Coding System: Core Coding System, ISO/IEC FDIS 15444-1: 2000 JPEG Image Coding System, incorporated herein by reference.) Under the JPEG 2000 Standard, each image may be divided into rectangular tiles. If there is more than one tile, the tiling of the image creates tile-components. After tiling of an image, the tile-components are decomposed into one or more different decomposition levels using a wavelet transformation. These decomposition levels contain a number of sub-bands populated with coefficients that describe the horizontal and vertical spatial frequency characteristics of the original tile-components. The coefficients provide frequency information about a local area, rather than across the entire image. In particular, a small number of coefficients completely describe a single sample.

In JPEG2000, the arithmetic coding and decoding is performed bit-plane by bit-plane, from the most significant bit plane to the least significant bit plane. This reveals a weak point in processors, as they are not efficient when operating in the bit plane level in 2D.

BRIEF DESCRIPTION OF THE DRAWINGS

FIG. 3 illustrates a diagram of an exemplary embodiment of a code-block scan pattern of a code-block.

DETAILED DESCRIPTION

Figure 1:
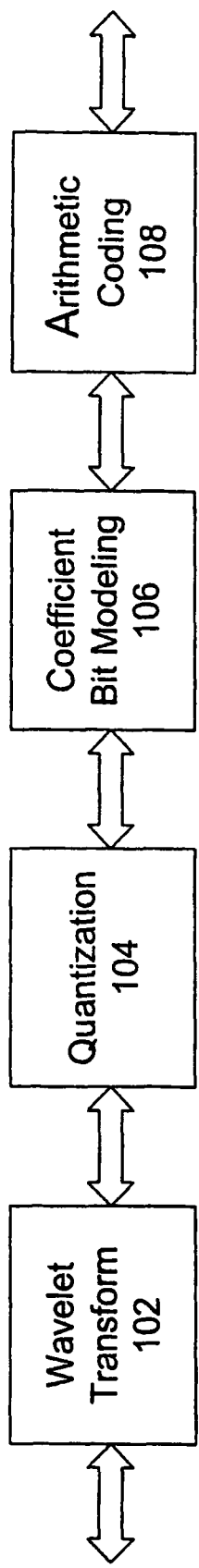
FIG. 1 illustrates a block diagram of one embodiment of a coder embodying the invention.

The principles of the arrangement described herein have general applicability to coding symbols representative of transform coefficients of one or more blocks of a digital image. For ease of explanation, the preferred embodiment is described with reference to JPEG2000. However, it is not intended that the present invention be limited to the described arrangement. For example, the invention may have application to bit-plane coding techniques in general and other coding techniques.

In JPEG2000, discrete wavelet transform coefficient bits are arranged into code-blocks and coded in bit plane order using three coding passes for each bit plane. A code-block is defined as a rectangular block within a sub-band. The coefficients inside the code-block are coded a bit plane at a time, starting with the most significant bit plane having a non-zero element and ending with the least significant bit plane.

For each bit plane in a code-block, a particular code-block scan pattern is used for each significance propagation, magnitude refinement and cleanup pass. Each coefficient bit is coded only once in one of the three passes. The pass in which a coefficient bit is coded depends on the conditions for that pass. For each pass, contexts are created using the significance states of neighboring coefficient bits of the coefficient bit currently being coded. The context is passed to an arithmetic coder along with the bit stream to effect entropy coding.

Embodiments of the invention provide an instruction that computes the horizontal and vertical values (H,V) based upon the following equations:

$$H = \min[1, \max(-1, \text{Sigma}[m,n-1]*(1-2*\text{Sign}[m,n-1]) + (\text{Sigma}[m,n+1]*(1-2*\text{Sign}[m,n+1])))] \qquad (1)$$

$$V = \min[1, \max(-1, \text{Sigma}[m-1,n]*(1-2*\text{Sign}[m-1,n]) + (\text{Sigma}[m+1,n]*(1-2*\text{Sign}[m+1,n])))] \qquad (2)$$

The current coding position is [m,n] and m=row, n=column, min is the minimum of two numbers (j,k), max is the maximum of two numbers (r,s), *=multiplication. Based upon the horizontal and vertical values (H,V) and the current sign bit being processed at [m,n], the output context and decision pair (CX,D) is determined placed into a destination register.

In the detailed description, numerous specific details are set forth in order to provide a thorough understanding of the present invention. However, it will be understood by those skilled in the art that the present invention may be practiced without these specific details. In other instances, well-known methods, procedures, components and circuits have been described in detail so as not to obscure the present invention.

Some portions of the detailed description that follow are presented in terms of algorithms and symbolic representations of operations on data bits or binary signals within a computer. These algorithmic descriptions and representations are the means used by those skilled in the data processing arts to convey the substance of their work to others skilled in the art. An algorithm is here, and generally, considered to be a self-consistent sequence of steps leading to a desired result. The steps include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities. Unless specifically stated otherwise as apparent from the following discussions, it is appreciated that throughout the specification, discussions utilizing such terms as "processing" or "computing" or "calculating" or "determining" or the like, refer to the action and processes of a computer or computing system, or similar electronic computing device, that manipulate and transform data represented as physical (electronic) quantities within the computing system's registers and/or memories into other data similarly represented as physical quantities within the computing system's memories, registers or other such information storage, transmission or display devices.

Embodiments of the present invention may be implemented in hardware or software (microcode), or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a micro-controller, an application specific integrated circuit (ASIC), or a microprocessor.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; and flash memory devices etc.

Before proceeding with a description of the preferred arrangement, a brief review of the JPEG2000 coding method is given. Referring to FIG. 1, a block diagram of one embodiment 100 of a coder embodying the invention is illustrated. As mentioned previously, JPEG2000 divides a whole image into one or more image tile components, each of which are then 2-D discrete wavelet transformed. The transform coefficients of each image tile component are then grouped into sub-bands, which sub-bands are further partitioned into rectangular code blocks before each code block is then entropy encoded.

In particular, embodiment 100 of coder includes a discrete wavelet transform (DWT) 102, quantizer 104, coefficient bit modeler 106 and entropy coder 108 suitable for compressing images in accordance with JPEG2000. The original image is first divided into tiles. These tiles are rectangular arrays that include the same relative portion of all the components that make up the image. Thus, tiling of the image actually creates tile-components that can be decoded independently of each other. These tile-components can also be extracted and reconstructed independently. This tile independence provides one of the methods for extracting a region of the image.

Figure 2:
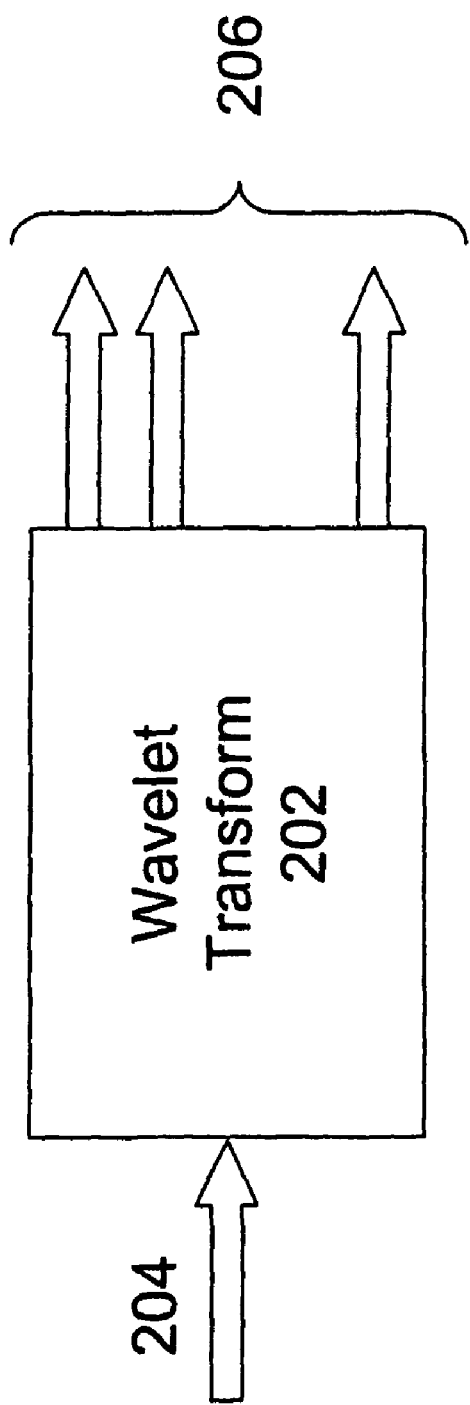
FIG. 2 illustrates a block diagram of one embodiment of a DWT decomposing an original image into subbands.

FIG. 2 illustrates a block diagram of one embodiment 200 of a DWT 202 decomposing an original image 204 into sub-bands 206. The tile components are decomposed into different decomposition levels using a wavelet transform. These decomposition levels contain a number of sub-bands populated with coefficients that describe the horizontal and vertical spatial frequency characteristics of the original tile-component planes. The coefficients provide frequency information about a local area, rather than across the entire image. That is, a small number of coefficients completely describe a single sample. A decomposition level is related to the next decomposition level by spatial powers of two. That is, each successive decomposition level of the sub-bands has approximately half the horizontal and half the vertical resolution of the previous. Images of lower resolution than the original are generated by decoding a selected subset of these sub-bands.

For example, a first DWT stage decomposes the original image ($LL_0$) into four sub-bands, denoted by the labels $LL_1$, $HL_1$, $LH_1$, and $HH_1$. The labels indicate the filtering and decomposition level ($LL_1$=low-pass filtering horizontally, low-pass filtering vertically, at the 1 st level of decomposition). These sub-bands are populated with wavelet coefficients that describe spatial frequency characteristics of the original image. The second stage further breaks down $LL_1$ into the four sub-bands $LL_2$, $HL_2$, $LH_2$, and $HH_2$. Although only three such stages are shown in FIG. 2, this process may continue for many stages. Each LLn sub-band is a reasonable low resolution rendition of $LL_{n-1}$ with half the width and height.

Although there are as many coefficients as there are samples, the information content tends to be concentrated in just a few coefficients. Through quantization 104, the information content of a large number of small magnitude coefficients is further reduced. Additional processing by the entropy encoder reduces the number of bits required to represent these quantized coefficients, sometimes significantly compared to the original image.

The individual sub-bands of a tile-component are further divided into code-blocks. These rectangular arrays of coefficients can be extracted independently. In particular, each sub-band, comprised of coefficients produced in the DWT, is subjected to uniform scalar quantization in the quantization step. The quantized coefficients of the sub-bands are further broken down into two-dimensional arrays (for example, 64×64 or 32×32 samples) called code-blocks.

The coefficients are associated with different sub-bands arising from the transform applied. These coefficients are then arranged into rectangular blocks with each sub-band, called code-blocks. These code-blocks are then coded a bit-plane at a time starting from the most significant bit-plane with a non-zero element to the least significant bit-plane.

For each bit-plane in a code-block, a special code-block scan pattern is used for each of the coding passes. Each coefficient bit in the bit-plane is coded in only one the three coding passes. The coding passes are called significance propagation, magnitude refinement, and cleanup. For each pass, contexts are created which are provided to the arithmetic coder along with the bit stream. The arithmetic coding step uses the context vectors and the corresponding coefficients to create a compressed data stream. In particular, the decision (D) and context (CX) pairs are processed together to produce compressed data (CD) output. CX selects the probability estimate to use during the coding of D. CX is a label for a context. The arithmetic coder is reset according to selected rules.

As stated above, the code-blocks of quantized coefficients are coded with three coding passes. These coding passes are performed on "bit planes," each of which is an array consisting of bits taken from the same position in each coefficient. The first bit plane is comprised of the most significant bits (MSB) of all the coefficient magnitudes in the code-block. The second bit-plane is comprised of the second MSBs of all the coefficient magnitudes in the code-block, and so on. Referring to FIG. 3, each quantized coefficient has four bits, for example, $a_1, a_2, a_3, a_4$. The MSB of each coefficient has a subscript of "1," for example, $a_1$. The first bit plane is comprised of $a_1, b_1, c_1, d_1$, the second bit-plane is comprised of $a_2, b_2, c_2, d_2$ and so forth until the least significant bits (LSB).

FIG. 3 is a diagram of an exemplary embodiment 300 of a code-block scan pattern of a code-block. Each bit-plane is scanned in a particular order. Starting at the top left 302, the first four bits of the first column 304 are scanned. Then the first four bits of the second column 306, until the width 308 of the code-block has been covered. Then the second four bits 310 of the first column are scanned and so on. A similar vertical scan is continued for any leftover rows on the lowest code-blocks in the sub-band.

This scan pattern is followed in each of the three coding passes. The decision as to in which pass a given bit is coded is made based on the "significance" of that bit's location and the significance of neighboring locations. A location is considered significant if a 1 has been coded for that location (quantized coefficient) in the current or previous bit planes.

The first pass is called the significance propagation pass. A bit is coded in this pass if its location is not significant, but at least one of its eight-connected neighbors is significant. If a bit is coded in this pass, and the value of that bit is "1," its location is marked as significant for the purpose of coding subsequent bits in the current and subsequent bit planes. Also, the sign bit is coded immediately after the "1" bit just coded.

The second pass is the magnitude refinement pass (MRP), where all bits from the locations that became significant in a previous bit plane are coded.

The third and final pass is the clean-up pass, where bits not coded in the first two passes are taken care of. The results of these three scanning passes are the context vectors for the quantized coefficients.

When encoding and decoding the bit planes sign coding/decoding may be performed in the clean up pass (CUP) and the significant propagation pass (SPP).

In general, a current coefficient can have 256 possible context vectors. These are clustered into a smaller number of contexts according to the rules specified below for context information. Four different context formulation rules are defined, one for each of the four coding operations: significance coding, sign coding, magnitude refinement coding and cleanup coding. These coding operations are performed in three coding passes over each bit plane: significance and sign coding in a significant propagation pass, magnitude refinement coding in a magnitude refinement pass, and cleanup and sign coding in a cleanup pass. For a given coding operation, the context label (or context) provided to the arithmetic coding engine is a label assigned to the current coefficient's context.

The sign coding and decoding is performed on values that are in sign magnitude format and not 2's or 1's complement. The sign coding process is based on bit state variables sigma and the sign bit associated with the bit being processed. When performing sign coding the sigma's and the sign bits are used to determine the output context pair (CX,D).

Figure 4:
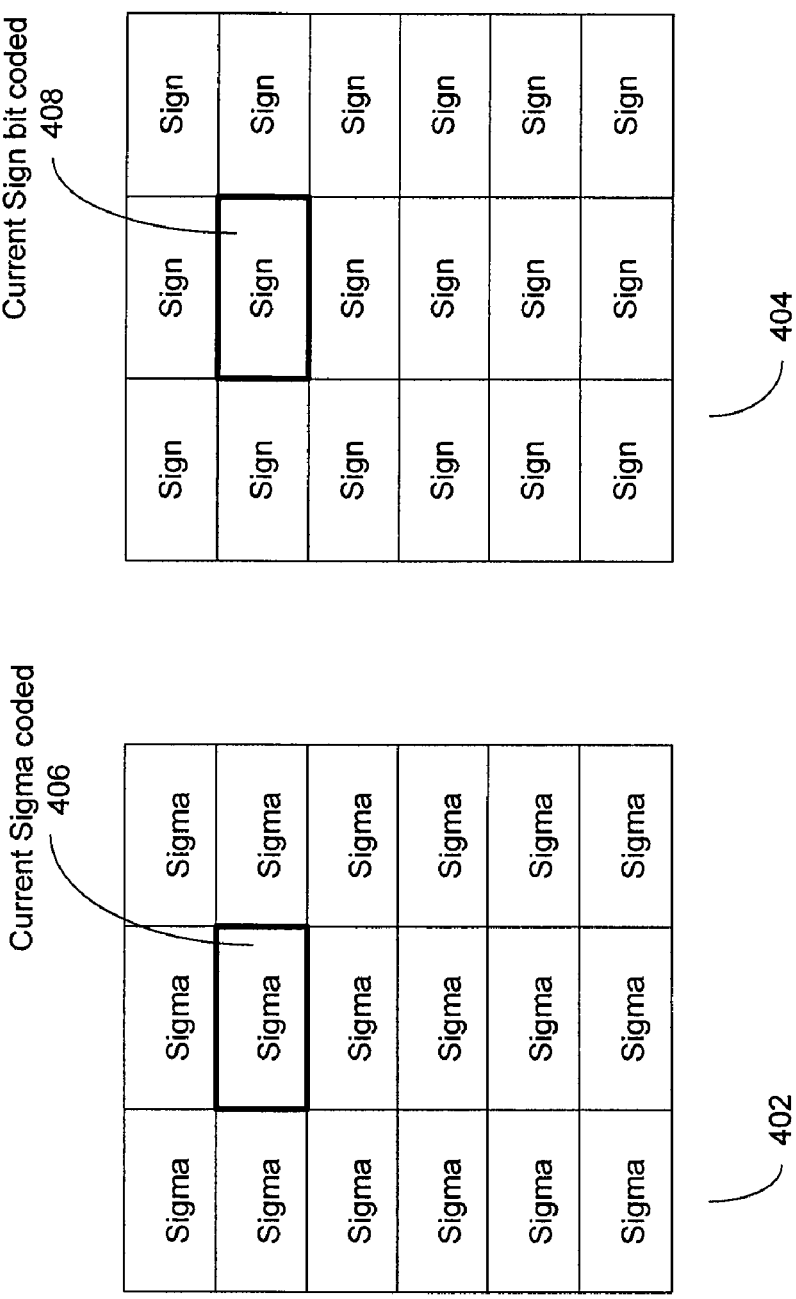
FIG. 4 illustrates a block diagram of one embodiment of registers storing values for significance state variables sigma and sign bits.

FIG. 4 illustrates a block diagram of one embodiment 400 of registers 402 and 404 storing values for significance state variables sigma and sign bits. Embodiments of the invention provide a sign coding instruction that uses bit state variable sigma and sign bits to determine an output context pair. The array of state variable sigmas 402 corresponds to an array of quantized coefficients being scanned. Each bit-plane of a code block is scanned in a particular order. Starting at the top left, the first four bit symbols of the column are scanned. Then the first four bit symbols of the second column, until the width of the code-block has been covered. Then the second four bit symbols of the first column are scanned and so on. A similar scan is continued for any leftover rows on the lowest code blocks in the sub-band. Sigma bits are typically stored in local processors registers in the same scan order as shown in FIG. 4. These can be shifted to the left to perform the same compare on the next scan.

For illustrative purposes, embodiments of the sign coding instruction will center on coefficient bit 406 in bold and the surrounding neighbors. In the code segment, the state variable of the quantized coefficient being currently scanned is located at 406. Embodiments of the instruction will compute the following horizontal and vertical values (H,V) based upon the following equations.

$$H=\min[1,\max(-1,\text{Sigma}[m,n-1]*(1-2*\text{Sign}[m,n-1])+(\text{Sigma}[m,n+1]*(1-2*\text{Sign}[m,n+1]))] \quad (1)$$

$$V=\min[1,\max(-1,\text{Sigma}[m-1,n]*(1-2*\text{Sign}[m-1,n])+(\text{Sigma}[m+1,n]*(1-2*\text{Sign}[m+1,n]))] \quad (2)$$

The current coding position is [m,n] and m=row, n=column, min is the minimum of two numbers (j,k), max is the maximum of two numbers (r,s), *=multiplication.

Based on the horizontal and vertical values (H,V) and the current sign bit 408 being processed at [m,n], the following output context and decision pair (CX,D) is placed into the destination register as shown in TABLE 1.

TABLE 1

| H | V | CX | D |
|---|---|----|----|
| 1 | 1 | 13 | Sign bit at [m, n] |
| 1 | 0 | 12 | Sign bit at [m, n] |
| 1 | -1 | 11 | Sign bit at [m, n] |
| 0 | 1 | 10 | Sign bit at [m, n] |
| 0 | 0 | 9 | Sign bit at [m, n] |
| 0 | -1 | 8 | Inverted Sign bit at [m, n] |
| -1 | 1 | 7 | Inverted Sign bit at [m, n] |
| -1 | 0 | 6 | Inverted Sign bit at [m, n] |
| -1 | -1 | 5 | Inverted Sign bit at [m, n] |

CX can take any variable but in this example 13 to 5 is used. The CX values of "13" to "5" are for exemplary purposes. Embodiments of the invention are not restricted to these or any values noted. Embodiments of the instruction also can automatically set the current sigma[m,n]=1 after the coding and/or decoding process. The instruction specifies the source column and current bit along with the destination register. The current bit can be specified from bit position 1 through bit position 4 in any column. For example, [1,n], [2,n], [3,n], [4,n].

The output is comprised of context and decision values (CX, D). These values may be deposited into a destination register specified by the instruction. The output of the instruction can produce from one or more context and decision (CX, D) pairs as shown in TABLE 1. The CX and D pairs are processed together by arithmetic encoder (FIG. 1, 108) to produce compressed data (CD) output. CX selects the probability estimate to use during the coding of D.

If a processor used a look up table to compute the CX values based upon (H, V), it would still have to calculate H, V, and D. To calculate H would require 13 instructions. To calculate V would also require 13 instructions. To calculate D would require 2 instructions (XOR and 1 Table lookup read). The total number is 28 instructions to calculate the context pair (CX, D). The total being 28 instructions needed to perform zero coding with standard instructions versus 1 instruction as embodiments of the invention describes.

To code a 64×64 pixel block with 15 bits, the sign coding can be performed once in each bit plane. Assuming that the average time sign coding is performed is 25% of the time in each bit case, the total times that sign coding might occur is 64×64×15×0.25=12288. Thus, with the addition of this instruction to a processor performing JPEG2000 would save 28×12288=344064 instructions for just a 64×64 pixel block because it is 28 times faster.

Figure 5:
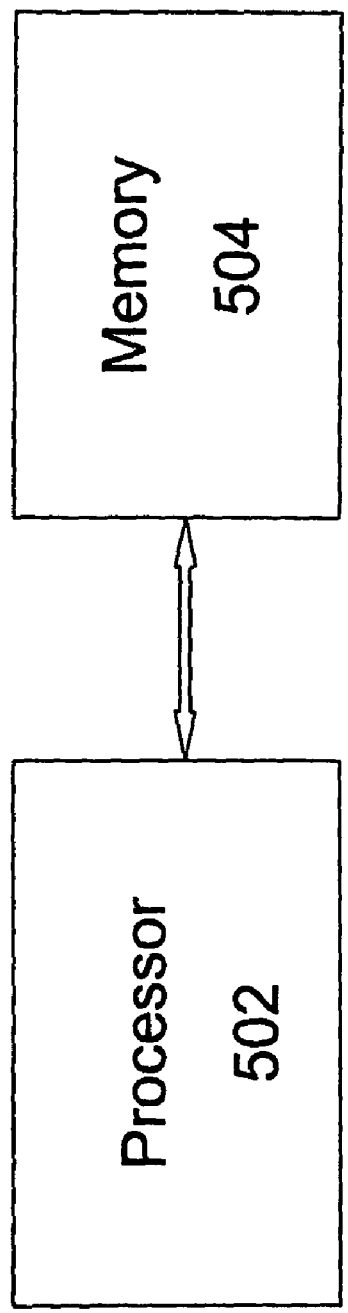
FIG. 5 is an embodiment of a system for implementing embodiments of the invention.

FIG. 5 is a system 500 for implementing embodiments of the invention. In particular, the system includes a processor 502 and memory 504. As noted above, for purposes of this application, a processing system includes any system that has a processor, such as, for example, a digital signal processor (DSP), a micro-controller, an application specific integrated circuit (ASIC), or a microprocessor. The system may be specially constructed for the required purposes, or it may comprise a general purpose computer selectively activated or reconfigured by a computer program stored in the computer. The processor 502 may be configured to format images compatible with the JPEG2000 format. Embodiments of the instruction will compute the horizontal and vertical values (H,V) in accordance with predefined equations. Based upon the computed horizontal and vertical values (H,V) and the current sign bit being processed at [m,n], the output context and decision pair (CX,D) are determined.

Decoding

The sign decoding instruction would take (CX,D) as it's input and produce the sign bit by (inverting or not) the D value based on CX as shown above in table 1. A source bit position [m,n] and destination register for inverting the sign bit register and source register holding (CX,D) are specified in the instruction.

The advantages of this invention allow a signal processor or a general processor to perform a vital piece of JP2000 bit plane coding and decoding at a much higher rate. If this instruction is included in the instruction set the processor has a greater advantage than without one when supporting JPEG2000.

Figure 6:
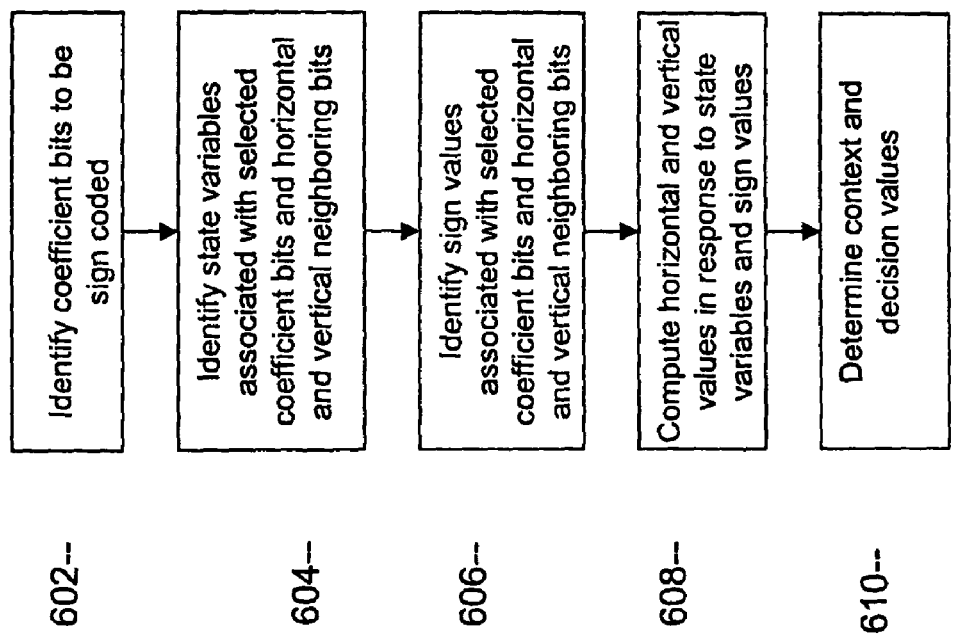
FIG. 6 is a flowchart of an embodiment for sign coding.

FIG. 6 is a flowchart of an embodiment 600 for sign coding.

In step 602, the coefficient bits to be sign coded are determined.

A sign coding instruction to generate context and decision values for the selected coefficient bits is implemented.

In particular, in step 604, state variables associated with selected coefficient bits and horizontal and vertical neighboring bits of the selected coefficient bits to be processed are identified. The state variables may be significance state variables and correspond to an array of quantized coefficients being scanned.

In step 606, sign values associated with selected coefficient bits and horizontal and vertical neighboring bits of the selected coefficient bits to be processed are identified.

In step 608, horizontal and vertical values in response to the state variables and sign values identified are computed. The horizontal values are computed in accordance with $$H=\min[1,\max(-1,\text{Sigma}[m,n-1]*(1-2*\text{Sign}[m,n-1])+(\text{Sigma}[m,n+1]*(1-2*\text{Sign}[m,n+1]))]$$

The vertical values are computed in accordance with $$V=\min[1,\max(-1,\text{Sigma}[m-1,n]*(1-2*\text{Sign}[m-1,n])+(\text{Sigma}[m+1,n]*(1-2*\text{Sign}[m+1,n]))]$$

wherein the current coding position is [m,n] and m=row, n=column, min is the minimum of two numbers (j,k), max is the maximum of two numbers (r,s), *=multiplication.

In step 610, context and decision values in response to the coefficient bit values are generated. The context and decision values are used to generate a compressed data output.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. Embodiments of the invention may be implemented in digital signal processors as well as standard processors because of the capabilities it provides for processing applications such as JPEG2000 as well as existing applications such as JPEG. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed:

1. A method for sign coding, comprising:
   determining coefficient bits to be sign coded;
   executing one sign coding instruction implemented in a processor to accelerate generation of context and decision values for the selected coefficient bits in a clean up pass and a significance propagation pass by reducing the number of instructions used by the processor to generate the context and decision values, the execution of the one sign coding instruction comprising:
   identifying state variables comprising sigma and sign bits, the state variables associated with selected coefficient bits and horizontal and vertical neighboring bits of the selected coefficient bits to be processed;
   identifying sign values associated with selected coefficient bits and horizontal and vertical neighboring bits of the selected coefficient bits to be processed;
   computing horizontal and vertical values in response to the state variables and sign values identified;
   generating context and decision values in response to the coefficient bit values; and
   processing the context and decision values by an arithmetic coder to generate compressed data output;
   wherein computing horizontal and vertical values in response to the state variables and sign values identified further comprises:
   computing the horizontal value in accordance with $$H=\min[1,\max(-1,\text{Sigma}[m,n-1]*(1-2*\text{Sign}[m,n-1])+(\text{Sigma}[m,n+1]*(1-2*\text{Sign}[m,n+1]))]$$

wherein the current coding position is [m,n] and m=row, n=column, min is the minimum of two numbers (j,k), max is the maximum of two numbers (r,s), *=multiplication.

2. The method claimed in claim 1, wherein computing horizontal and vertical values in response to the state variables and sign values identified further comprises:
   computing the vertical value in accordance with $$V=\min[1,\max(-1,\text{Sigma}[m-1,n]*(1-2*\text{Sign}[m-1,n])+ (\text{Sigma}[m+1,n]*(1-2*\text{Sign}[m+1,n]))]$$

wherein the current coding position is [m,n] and m=row, n=column, min is the minimum of two numbers (j,k), max is the maximum of two numbers (r,s), *=multiplication.

3. The method claimed in claim 1, wherein the state variables are significance state variables.

4. The method claimed in claim 1, wherein the state variables correspond to an array of quantized coefficients being scanned.

5. The method claimed in claim 1, wherein the instruction is used for JPEG2000.

6. A system, comprising:
   a memory;
   a processor to execute one sign coding instruction to accelerate generation of context and decision values for the selected coefficient bits in a clean up pass and a significance propagation pass by reducing the number of instructions used by the processor to generate the context and decision values, the execution of the one sign coding instruction comprising:
      identifying state variables comprising sigma and sign bits, the state variables associated with selected coefficient bits and horizontal and vertical neighboring bits of the selected coefficient bits to be processed;
      identifying sign values associated with selected coefficient bits and horizontal and vertical neighboring bits of the selected coefficient bits to be processed;
      computing horizontal and vertical values in response to the state variables and sign values identified;
      generating context and decision values in response to the coefficient bit values; and
      processing the context and decision values by an arithmetic coder to generate compressed data output;
   wherein computing horizontal and vertical values in response to the state variables and sign values identified further comprises:
      computing the vertical values in accordance with $$V=\min[1,\max(-1,\text{Sigma}[m-1,n]*(1-2*\text{Sign}[m-1,n])+ (\text{Sigma}[m+1,n]*(1-2*\text{Sign}[m+1,n]))]$$

wherein the current coding position is [m,n] and m=row, n=column, min is the minimum of two numbers (j,k), max is the maximum of two numbers (r,s), *=multiplication.

7. The system claimed in claim 6, wherein computing horizontal and vertical values in response to the state variables and sign values identified further comprises:
   computing the horizontal values in accordance with $$H=\min[1,\max(-1,\text{Sigma}[m,n-1]*(1-2*\text{Sign}[m,n-1])+ (\text{Sigma}[m,n+1]*(1-2*\text{Sign}[m,n+1]))]$$

wherein the current coding position is [m,n] and m=row, n=column, min is the minimum of two numbers (j,k), max is the maximum of two numbers (r,s), *=multiplication.

8. The system claimed in claim 6, wherein the state variables are significance state variables.

9. The system claimed in claim 6, wherein the state variables correspond to an array of quantized coefficients being scanned.

10. The system claimed in claim 6, wherein the instruction is used for JPEG2000.

11. A non-transitory machine readable storage medium having stored therein a plurality of machine readable instructions executable by a processor to determine sign coding, comprising:
    determining coefficient bits to be sign coded;
    executing one sign coding instruction implemented in a processor to accelerate generation of context and decision values for the selected coefficient bits in a clean up pass and a significance propagation pass by reducing the number of instructions used by the processor to generate the context and decision values, the execution of the one sign coding instruction comprising:
       identifying state variables comprising sigma and sign bits, the state variables associated with selected coefficient bits and horizontal and vertical neighboring bits of the selected coefficient bits to be processed;
       identifying sign values associated with selected coefficient bits and horizontal and vertical neighboring bits of the selected coefficient bits to be processed;
       computing horizontal and vertical values in response to the state variables and sign values identified;
       generating context and decision values in response to the coefficient bit values; and
       processing the context and decision values by an arithmetic coder to generate compressed data output;
    wherein computing horizontal and vertical values in response to the state variables and sign values identified further comprises:
       computing the vertical values in accordance with $$V=\min[1,\max(-1,\text{Sigma}[m-1,n]*(1-2*\text{Sign}[m-1,n])+ (\text{Sigma}[m+1,n]*(1-2*\text{Sign}[m+1,n]))]$$

wherein the current coding position is [m,n] and m=row, n=column, min is the minimum of two numbers (j,k), max is the maximum of two numbers (r,s), *=multiplication.

12. The machine readable storage medium claimed in claim 11, wherein computing horizontal and vertical values in response to the state variables and sign values identified further comprises:
    computing the horizontal values in accordance with $$H=\min[1,\max(-1,\text{Sigma}[m,n-1]*(1-2*\text{Sign}[m,n-1])+ (\text{Sigma}[m,n+1]*(1-2*\text{Sign}[m,n+1]))]$$

wherein the current coding position is [m,n] and m=row, n=column, min is the minimum of two numbers (j,k), max is the maximum of two numbers (r,s), *=multiplication.

13. The machine readable storage medium claimed in claim 11, wherein the state variables are significance state variables.

14. The machine readable storage medium claimed in claim 11, wherein the state variables correspond to an array of quantized coefficients being scanned.

* * * * *